April 15, 1969  G. REHM  3,439,270
ELECTRICAL DEVICE FOR INDICATING THE MATHEMATICAL
PRODUCT OF TWO ELECTRICAL QUANTITIES
Filed April 5, 1966
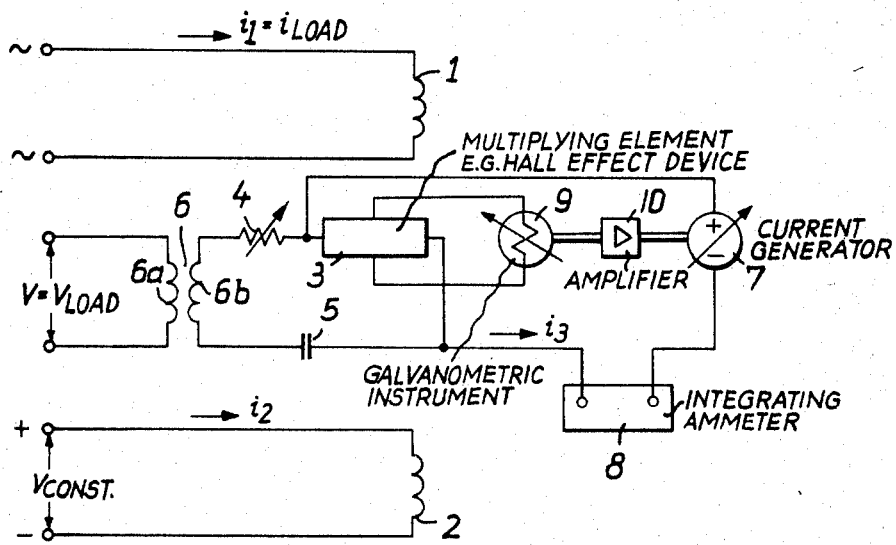
Inventor:
Georg Rehm
By: Spencer & Kaye
Attorneys

United States Patent Office 3,439,270
Patented Apr. 15, 1969

3,439,270
ELECTRICAL DEVICE FOR INDICATING THE MATHEMATICAL PRODUCT OF TWO ELECTRICAL QUANTITIES
Georg Rehm, Notherstrasse 63, Erlangen-Bruck, Germany
Filed Apr. 5, 1966, Ser. No. 540,283
Claims priority, application Germany, Apr. 12, 1965, R 40,374
Int. Cl. G01r 7/12, 11/32
U.S. Cl. 324—142                8 Claims

ABSTRACT OF THE DISCLOSURE

An electrical device having two alternating current inputs and two direct current inputs and arranged for producing an output which is proportional to the difference between the D.C. component of the product of the two alternating currents and the product of the two direct currents, the device further including a circuit arrangement for varying one of the direct currents so as to cause the resulting output to tend toward a value of zero, whereby the average value of the current which is varied will be proportional to the D.C. component of the product of the two alternating currents.

---

The present invention relates to electrical measuring devices, and particularly to a device for obtaining the mathematical product of two quantities which are convertible into alternating currents having the same frequency.

For monitoring the rate of consumption of electrical power, there exist induction motor-type counters for measuring the amount of electrical energy consumed by an installation. Experience has shown that measuring devices of this type are generally reliable and operate with a reasonably high degree of accuracy. However, since energy consumption meters of this type employ moving parts, these parts must be made with a high degree of accuracy if the meter is to be capable of providing accurate readings for a substantial period of time. Consequently, the manufacture of meters of this type is relatively complicated and time-consuming so that such meters do not readily lend themselves to mass production techniques. Another drawback inherent in such meters is that they are extremely sensitive to external influences.

Various types of electrical power measuring devices having no moving parts have already been proposed, these devices generally utilizing semiconductor components. For example, circuits employing semiconductor Hall effect devices have been suggested. However, meters incorporating such Hall effect devices have not found wide use, partly because the output from a Hall effect device is subject to disturbances caused by various external influences. For example, devices of this type are particularly sensitive to temperature fluctuations. In order to overcome this drawback, meters incorporating such Hall effect devices must be provided with suitable compensating means which, it will be appreciated, substantially increase the difficulty and cost of manufacture.

It is therefore an object of the present invention to overcome the above-noted drawbacks.

Another object of the present invention is to provide an improved arrangement for measuring electrical energy consumption.

Still another object of the present invention is to provide an energy consumption measuring device which requires no moving parts and which is relatively insensitive to external influences.

With these and other objects in view, the present invention resides principally in a device for obtaining the mathematical product of two quantities which can be represented by two alternating currents having the same frequency. This device includes a multiplying element for providing an output proportional to the D.C. component of the product of two alternating currents of the same frequency and the product of a constant amplitude direct current and a variable direct current. The device also includes means operatively associated with the multiplying element for supplying input signals thereto proportional to the currents whose products are to be obtained. The device further includes null indicating regulator means connected to the output of the multiplying element and to the signal supplying means for varying the average value of the signal proportional to the variable direct current in a direction to cause the D.C. component of the product of two alternating currents to equal the product of the two direct currents. In this arrangement, the average value of the variable direct current will thus be proportional to the D.C. component of the product of the two alternating currents.

Additional objects and advantages of the present invention will become apparent upon consideration of the following description when taken in conjunction with the accompanying drawing in which the single figure is a circuit diagram of a preferred embodiment of the present invention.

The circuit illustrated in the drawing includes two field windings 1 and 2 which are positioned to subject a Hall effect device 3 to a magnetic field which extends in a first direction through Hall effect device 3. The current $i_1$ flowing through the field winding 1 is also in this case, the current which flows through a load whose power consumption is to be measured. The field winding 2 is connected across the terminals of a regulated D.C. voltage source which causes a constant amplitude direct current $i_2$ to flow therethrough.

Control current terminals connected to supply a control current to the Hall effect device are also connected in series with a variable resistor 4 and a capacitor 5, this series circuit being connected across the secondary winding 6b of a transformer 6. The value of resistor 4 can be varied to achieve the desired proportionality between voltage V and the current from winding 6b. The primary winding 6a of transformer 6 is connected across the load voltage source V, the current supplied by winding 6b thus being proportional in amplitude to voltage V. The control current terminals of the Hall effect device 3 are also connected across a direct current source 7 which supplies a current $i_3$ between these terminals. The amplitude of current $i_3$ is controlled in a manner to be described below. The control current terminals are arranged to cause current to flow through device 3 in a direction substantially transverse to the direction of the magnetic fields produced by windings 1 and 2. A current indicator 8, which is preferably of the integrating type, is connected in series in the path through which the current $i_3$ flows to provide an indication of the time integral of the average value of this current. The current $i_3$ may be in the form of D.C. pulses.

A galvanometric instrument 9 is connected across the Hall voltage terminals of device 3. Instrument 9 cooperates with an amplifier 10 to form a null indicator. The output of amplifier 10 is connected to control D.C. source 7 in such a way to vary the amplitude of direct current $i_3$ in dependence on the direction of current flow through instrument 9.

In the illustrated circuit, Hall effect device 3 forms, among other things, the product V and $i_1$ the direct current component of this product appearing between the Hall voltage terminals connected between device 3 and instrument 9, these voltage terminals being connected to device 3 at opposite surfaces thereof which are spaced apart in a direction which is transverse both to the direction of the magnetic field, and the direction of the spacing between the control current terminals. This direct current component of the product $V \times i_1$ is proportional to the active load power $V \times i_1 \times \cos \phi$, where $\cos \phi$ is the power factor of the load circuit. In addition, the Hall effect device 3 forms a product proportional to the amplitudes of the currents $i_2$ and $i_3$.

According to the present invention, the current generator 7 is so poled that the Hall voltage component proportional to the products $i_2$ and $i_3$ has the opposite polarity from the Hall output voltage representing the direct current component of the product $V \times i_1$. Therefore, the instrument 9 will read zero when the D.C. voltage product of $i_2 \times i_3$ is equal to the D.C. component of the A.C. voltage product of $V \times i_1$.

Amplifier 10 is constructed to have the amplification factor required to give the measuring instrument its desired sensitivity. The output of amplifier 10 is connected to vary the output from current source 7 in the required direction whenever a predetermined minimum current level flows through instrument 9.

One of the principal advantages of the present invention is that external influences, or changes in the characteristics of the semiconductor element, have relatively no effect on the accuracy of the instrument since such influences or changes will affect both product components of the output voltage equally.

It may thus be seen that, in accordance with the present invention, there is provided an arrangement for obtaining the mathematical product of any two quantities which can be converted into alternating currents having the same frequency. Embodiments of the present invention particularly include a multiplying element for forming the D.C. component of the product of two alternating currents and the product of a constant amplitude direct current and a variable amplitude direct current, and a null indicator for comparing the D.C. component of the product of the two alternating currents with the product of the two direct currents, this null indicator being connected across the output of the multiplying element. The null indicator will be balanced when the direct current product is equal to the D.C. component of the alternating current product.

In the preferred embodiment of the present invention, the multiplying element is constituted by a Hall effect device which is exposed to a first magnetic field whose value is proportional to one of the two alternating currents and to a second magnetic field which extends parallel to the first magnetic field and which has a value proportoinal to the constant amplitude direct current. The other alternating current and the variable direct current are connected to constitute the control current for the Hall effect device. The null indicator, which controls the amplitude of the variable direct current, is in turn controlled by the output voltage from the Hall effect device, which voltage extends, in the Hall effect device, in a direction transverse both to the direction of control current flow and the direction of the magnetic field. The control current direction is also transverse to the direction of the magnetic field.

The regulated direct current produced by source 7 can be in the form of a train of D.C. pulses having a constant amplitude and pulse duration, the average current output $i_3$ being determined by the repetition rate of the pulses produced by this source. With the amplitude of current $i_2$ being maintained constant, the pulse repetition rate from source 7 will then be proportional to the D.C. component of the alternating current product.

If it is desired to vary the multiplication factor of the device, this can be readily accomplished merely by varying the amplitude of direct current $i_2$.

The null indicator for the device is balanced by causing the average value of the current $i_3$ to remain at a level which causes the output Hall voltage to equal zero. This may be accomplished in a simple manner by causing the output from amplifier 10 to vary the pulse rate of the output of source 7, the polarity of the output of amplifier 10 determining the direction of the pulse rate variation. In one form of construction, source 7 may simply be constituted by a voltage-controlled pulse generator or oscillator, such devices being commercially available and well known in the art. An ammeter placed in the path of current $i_3$ will then provide an indication proportional to the rate of active power consumption in the load.

The arrangement according to the present invention is particularly suitable for use as a device for indicating the power consumption in a load when one of the alternating currents influencing the Hall effect device is proportional to, or constituted by, the load current and the other alternating current influencing the Hall effect device is proportional to the load voltage. The D.C. component of the product $V \times i_1$ forming one output from the Hall effect device will then be proportional to the actual active load power consumption $V \times i_1 \times \cos \phi$.

For determining the total energy consumption in the load 1 over a period of time, an integrating current meter 8 is provided. The output of this indicator will be equal to the total energy consumed in the load, e.g., the average power consumed therein multiplied by the time interval of the measurement.

What is claimed is:

1. A device for obtaining the mathematical product of two quantities which can be represented by two alternating currents having the same frequency, comprising, in combination:

first input means providing a first alternating current having a variable amplitude;

second input means providing a second alternating current having a variable amplitude and having the same frequency as said first alternating current;

third input means providing a direct current having a constant amplitude;

controllable input means providing a direct current having a variable amplitude;

a multiplying element electrically linked to all of said input means and responsive to the signals therefrom for providing an output proportional to the D.C. component of the product of said first and second alternating currents and the product of said constant amplitude and variable amplitude direct currents; and null indicating regulator means connected between the output of said multiplying element and said controllable input means and including an element which acts on said controllable means for varying the value of such variable direct current in a direction to cause the D.C. component of said product of two alternating currents to equal said product of two direct currents, whereby the average value of such variable direct current will be proportional to the D.C. component of said product of two alternating currents.

2. An arrangement as defined in claim 1 wherein said multiplying element is constituted by a Hall effect device, said first input signal supplying means include first magnetic field generating means arranged to subject said Hall effect device to a magnetic field whose amplitude is proportional to said first alternating current, said third input means include second magnetic field producing means arranged for subjecting said Hall effect device to a magnetic field whose amplitude is proportional to said constant amplitude direct current, said second input means include first current producing means for applying a control current to said Hall effect device which is proportional to said second alternating current, and said fourth input means include second current producing means for applying a control current to said Hall effect device which is proportional to said variable direct current.

3. An arrangement as defined in claim 2 for use as an electric power meter, wherein one of said alternating currents is proportional to the current flowing through a load to be monitored and the other one of said alternating currents is proportional to the voltage across such load, said arrangement further comprising a current value indicator connected to receive said variable direct current and to provide an indication of its average value.

4. An arrangement as defined in claim 2, wherein the signal proportional to said variable direct current supplied by said second current producing means is in the form of a train of D.C. pulses.

5. An arrangement as defined in claim 4 wherein said D.C. pulse train has a constant amplitude and a variable repetition rate.

6. An arrangement as defined in claim 1 wherein said third input means are adjustable to change the value of said constant amplitude direct current for varying the multiplication ratio of said multiplying element.

7. An arrangement as defined in claim 1 wherein said regulator means varies the average value of the signal proportional to said variable direct current by a self-balancing operation.

8. An arrangement as defined in claim 1 wherein said multiplying element provides an output proportional to the difference between the D.C. component of the product of said first and second alternating currents and the product of said constant amplitude and variable amplitude direct currents.

References Cited
UNITED STATES PATENTS

| | | | |
|---|---|---|---|
| 3,317,835 | 5/1967 | Dietz et al. | 324—142 X |
| 3,370,241 | 2/1968 | Saraga | 324—45 X |

RUDOLPH V. ROLINEC, Primary Examiner.

A. E. SMITH, Assistant Examiner.

U.S. Cl. X.R.

235—194; 323—94; 324—117, 140